Sept. 9, 1952     R. A. MULL     2,609,612
SINE PROTRACTOR
Filed Aug. 14, 1946     2 SHEETS—SHEET 1
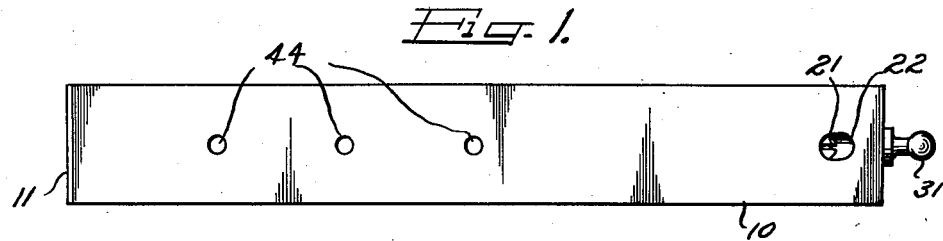
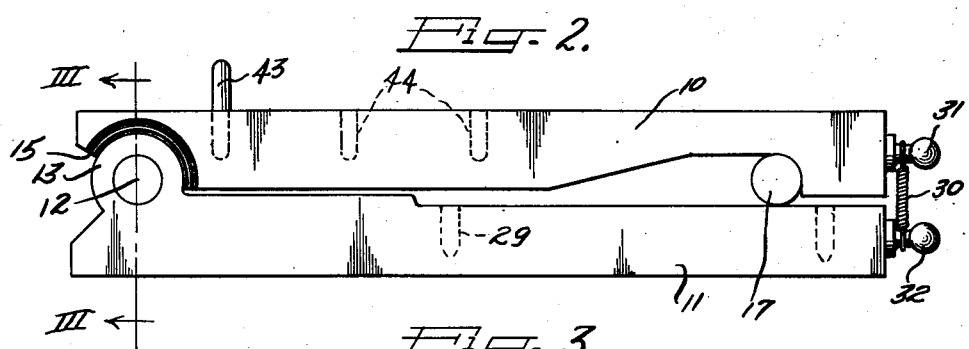
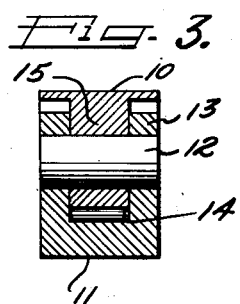
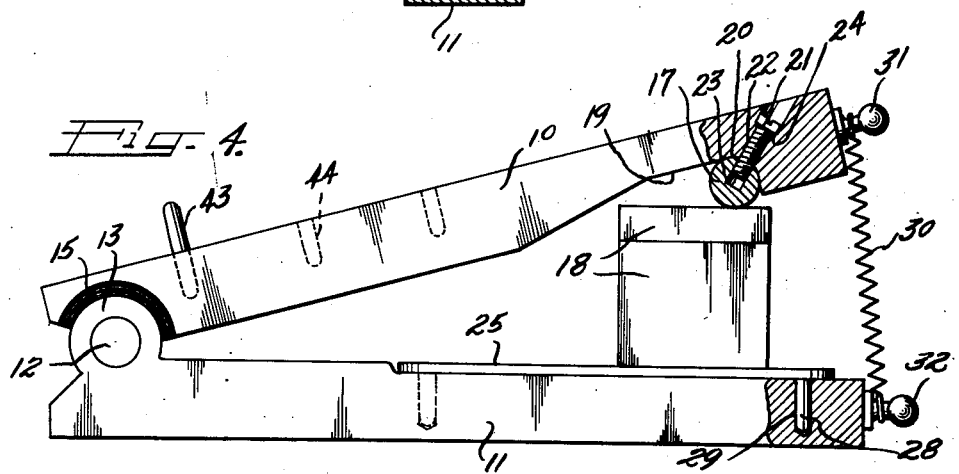
Inventor
RAYMOND A. MULL Sept. 9, 1952 — R. A. MULL — 2,609,612
SINE PROTRACTOR
Filed Aug. 14, 1946 — 2 SHEETS—SHEET 2
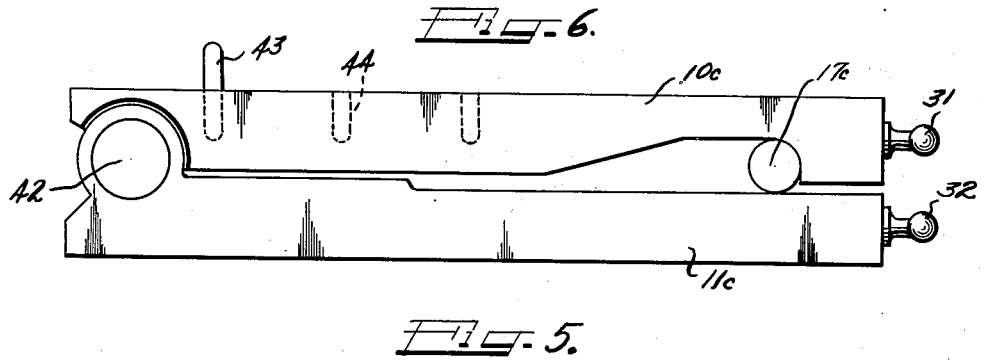
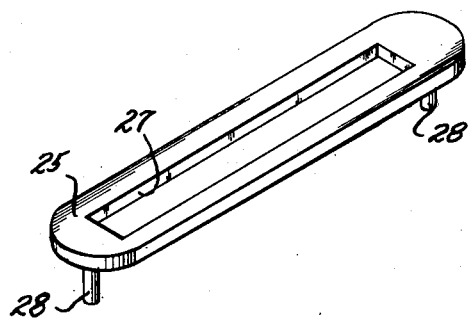
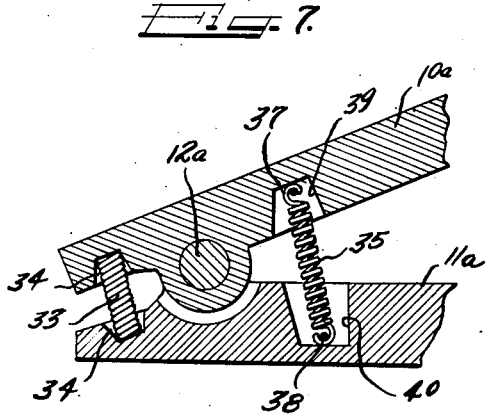
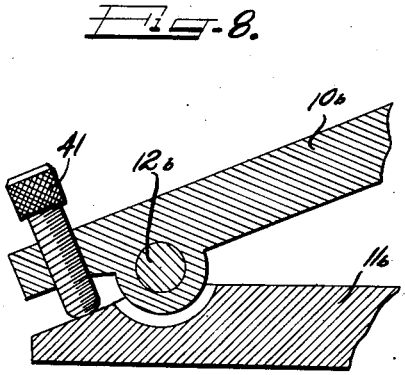
Inventor
RAYMOND A. MULL Patented Sept. 9, 1952

2,609,612

UNITED STATES PATENT OFFICE 2,609,612

SINE PROTRACTOR

Raymond Arthur Mull, St. Joseph Township, Berrien County, Mich.

Application August 14, 1946, Serial No. 690,371

4 Claims. (Cl. 33—174)

This invention relates to improvements in sine protractors, and more especially to a novel sine protractor structure wherein a sine bar is pivotally mounted upon a readily portable base.

An important object of the present invention is to provide a new and improved sine protractor in which any desired angular setting can be quickly and easily obtained merely by blocking up one end of the sine bar member of the protractor.

Another object of the invention is to provide a sine protractor of this type in which the preferred setting is adapted to be maintained positively in a manner to permit the protractor to be moved from place to place in use without disturbing the angular setting or requiring any resetting of the device for the predetermined angle for which the protractor has been adjusted.

A further object of the invention is to provide a hinged sine protractor having improved means for maintaining the same in any selected position of angular adjustment.

Still another object of the invention is to provide a hinged sine protractor having improved resilient means for maintaining the same in angular adjustment.

It is also an object of the invention to provide in a sine protractor improved means for maintaining a gage block in assembled position to permit handling of the device in adjusted condition for movement to various points of use.

A still further object is to provide a sine protractor which is readily adapted to serve as a support for work pieces to be machined to or at a particular angle.

Yet another object of the invention is to provide a sine protractor which is readily portable in set or adjusted condition and is adapted to be reversed at will for presenting a supported work piece in reversed angularity to a tool or machine to work thereon or for checking reverse angles, etc.

Other objects, features, and advantages of the present invention will be readily apparent from the following detailed description of certain preferred or exemplary embodiments of the invention and in the accompanying two sheets of drawings wherein:

Figure 1 is a top plan view of a sine protractor embodying the features of the present invention;

Figure 2 is a side elevational view of the sine protractor;

Figure 3 is a vertical detail sectional view taken substantially in the plane of line III—III of Figure 2;

Figure 4 is a side elevational view of the sine protractor, showing the same adjusted to a desired working angle, and with certain parts broken away and in section to reveal details of structure;

Figure 5 is an isometric view of a gage block holder adapted to be used with the sine protractor;

Figure 6 is a side elevational view of a slightly modified form of the sine protractor;

Figure 7 is a fragmentary longitudinal sectional view through a further modified form of the invention; and Figure 8 is a fragmentary longitudinal sectional detail view of a further modified form of the invention.

A sine protractor according to the present invention is adapted to be constructed in the form of a small compact unit comprising a sine bar 10 and a base bar 11 of approximately the same length and preferably of the same width hingedly connected together at one end by means of a hinge pin 12. For this purpose the base bar 11 may be formed at its hinge end with a spaced parallel integral pair of upstanding ears 13 providing therebetween a parallel wall slot or groove 14 within which is received a hinge tongue 15 integral with the companion end of the sine bar 10. An accurately machined sliding bearing fit is provided between the hinge ears and tongue for accuracy in operation.

The top face of the sine bar 10 and the bottom face of the base bar 11 are both machined to a high degree of flat planar accuracy, and the hinge axis through the pin 12 is disposed in a line with the parallel axis of a gaging cylinder 17 adjacent to the opposite end of the sine bar 10. In the closed position of the protractor, as shown in Fig. 2, said line between the hinge and cylinder axes is parallel to the top and bottom faces of the device.

In order to accommodate a gage block or gage block assembly 18 upon the upper face of the base bar 11 and thereby enable the gage blocks to be carried along with the protractor when it is moved from place to place, the gaging cylinder 17 is carried by the lower or inner face of the sine bar 10 and may conveniently be mounted within a gage block clearance recess 19 in the sine bar under-face. A cradling forward corner formation 20 receives the cylinder 17 and provides a seat or base therefor. By preference, the cylinder base 20 is formed on a complementary radius to afford maximum bearing engagement of the cylinder therewith.

Means such as a screw 21 extending through a rearwardly diagonal bore 22 in the forward end of the sine bar 10 and opening radially through the cylinder base 20 is threaded into a screw socket 23 formed radially in the cylinder 17. The head of the screw 21 engages an outwardly facing shoulder 24 disposed well within the bore 22 and against which the screw-head is driven tightly to secure the cylinder in place, with the screw head sunk below the upper face of the sine bar.

The diameter of the gaging cylinder 17, and the thickness of the base bar 11 where the cylinder contacts it or the gage blocks 18 are mounted are so related that the two bars extend in true parallelism in the fully collapsed condition of the protractor.

The distance between the axes of the hinge pin 12 and the cylinder 17 is predetermined, preferably according to usual sine bar practice, to five inches or ten inches, as desired. Therefore any angle desired in the top surface of the sine bar 10 can be attained by reference to a table of natural sines and setting or adjusting the angle of sine bar 10 so that the perpendicular distance between the gaging cylinder 17 and the top surface of the base bar 11 is the proper multiple, that is five or 10 times, as the case may be, of the natural sine of the angle to be achieved. In other words, the base bar 11 herein serves as the surface plate for the sine bar 10 with one end of the sine bar at all times in fixed pivotal relation to the surface plate.

The gage blocks 18 are of the customary type used for setting sine bars, and means are preferably provided on the base bar 11 for retaining the gage blocks removably in place and against accidentally being dislodged when the protractor is moved from place to place in use. This enables the protractor to be set for any preferred angle and then moved to wherever it is needed. This affords a great convenience for inspection purposes and for tool or work set-up purposes. To this end, a retainer 25 is provided which may be in the form of a flat plate adapted to rest flatwise against the upper gage block supporting surface of the base bar 11 and is equipped with a retaining slot 27 (Fig. 5) of a width to receive the lower end or the edge of the gage block 18 closely. By preference, the retainer 25 is of substantial length so that the slot 27 can be made long enough to receive the gage block lengthwise on edge as well as on end.

The retainer plate 25 is adapted to be held in place on the base bar 11 by means such as integral retainer pins or dowels 28 extended slidably into appropriate sockets 29 in the base plate. In this way, the retainer plate 25 can be readily lifted up to release the dowels 28 from the sockets 29 for removing the gage blocks by sliding them off the base bar. Likewise, in effecting an adjustment assembly the retainer plate 25 can be put in place after a selected gage block has been slid onto the base bar.

Another feature which is valuable in maintaining a particular angular setting of the sine protractor provides a means for holding the sine bar 10 and the base bar 11 in substantially clamped relationship with respect to the gage blocks 18. This means may comprise a contractile spring member 30 engaged at one end upon the stem of a handle 31 projecting from the free end of the sine bar 10 and at the other end upon the stem of a handle 32 extending from the free end of the base bar 11. As the sine bar 10 is swung open or away from the base bar 11 the spring 30 is placed under tension and thereby acts to hold the sine bar tight against the top of the gage block 18. If preferred, of course, the clamping spring 30 may be disconnected from either or both of the handles 31 or 32 until the desired angular adjustment of the sine bar 10 has been effected and then the spring can be stretched and anchored onto the handle or handles from which it has been disconnected.

In another form (Fig. 7), an expansile compression spring structure 33 may be provided to act between the rearwardly protruding ends or extensions of sine bar 10a and base bar 11a beyond the hinge 12a. For this purpose, the end extensions may have therein respective opposing sockets 34 for retaining the ends of the compression spring. With this arrangement when the sine bar 10a is swung up, the end extensions of the bars with the compression spring 33 therebetween swing toward one another and place the spring under compression. The compression load of the spring 33 reacts to urge the opposite or gaged end portions of the bars toward one another into compressing relation to the gage block 18 assembly therebetween.

In addition to the compression spring 32, or as an alternative therefore, the sine protractor may be equipped with a contractile tension spring 35 operative inwardly from the hinge 12a. This may be in the form of a coil spring having integral opposite terminal hooks 37 engaging respective transverse anchoring pins 38 within sockets 39 and 40 formed in alignment with the opposing inner faces of the sine bar 10a and the base bar 11a, respectively. With this spring 35, as the bars are spread apart in effecting an adjustment, the spring is expanded and placed under tension thereby reacting to draw the bars toward one another.

Where it is preferred or necessary to effect positive locking of the bars in adjusted condition, the structure shown in the modification of Fig. 8 may be adopted. In this form, the sine bar 10b and the base bar 11b have end extensions beyond the outer side of the hinge 12b similar to the end extensions shown in Fig. 7. This affords an opposing jaw structure. A knurl-headed, micrometer-threaded locking screw 41 is threaded through the end extension of the sine bar and bears against the opposing face of the end extension of the base bar. This locking screw 41 is adapted to be driven home after the desired angular adjustment of the bars has been effected and acts to urge the bars to pivot about the hinge 12b to drive them toward one another and thereby into tight clamping engagement against the gage block assembly utilized in effecting the angular adjustment. If desired, of course, the locking screw 41 may comprise a click assembly after the manner of the ratchet mechanism of a micrometer, so as to avoid over-tightening.

It is obvious, of course, that in any of the expedients of the forms of Figures 7 and 8, the tension spring 30 may be used, or, putting it the other way, any one or a combination of the expedients shown in Figures 7 and 8 may be used with the tension spring 30. On the other hand any of the locking or holding expedients may be used alone. Furthermore, instead of compression or tension springs as shown in the form of Fig. 7, an obviously equivalent torsion spring structure may be substituted or used as a supplement.

While in the form of the hinge shown in Figures 1 to 4, inclusive, the hinge pin 12 and the cylinder 17 are of the same diameter for purposes of economy and expediency as well as to conform to the usual practice, at least in the visual sense, the really important thing is to have the axes of the hinge pin and the gaging cylinder in a common plane parallel to the effective surfaces of the bars in the fully collapsed position of the device. As seen in Fig. 6, the sine bar 10c and the base bar 11c are hingedly connected by a hinge pin 42 of substantially greater diameter than the gaging cylinder 17c. However, the axis of the hinge pin 42 is in a common plane with the axis of the gaging cylinder 17c and such plane is strictly parallel to the top or angle face of the sine bar 10c. On the other hand, the hinge pin could be substantially smaller in diameter than the gage cylinder, but the larger size hinge pin as well as the hinge pin bearings in the bars are easier to machine to the requisite accuracy.

As an aid in locating work, with respect to a cutting or shaping tool, such as a milling cutter, for example, while utilizing the sine protractor as a support for the work upon which an angular face or surface is to be machined the upper or angle determining face of the sine bar 10 is preferably equipped with work-stop means such as a pin 43. This pin 43 is preferably removably and adjustably received in one or more pin sockets 44 sunk within the upper angle surface of the sine bar. As shown, by way of example, a longitudinal series of the pin sockets 44 is provided, herein three in number and located in the portion of the sine bar nearest the hinge. By having the stop pin 43 removable, it can be readily mounted in any one of the sockets 44 or it can be removed entirely where the angle face of the sine bar is to be left free.

By having the sine and base bars relatively narrow the protractor can be used in working environments of relatively small lateral clearance, and particularly where the protractor is to be used as a work support in a machine in which work is to be done upon the supported work piece.

Another advantage inherent in the present sine protractor is that it can be readily utilized for measuring, determining, or inspecting, for reverse angles or for supporting a work piece for machining of reversely angular surfaces. This is adapted to be effected merely by turning the protractor about end for end, without any need for readjusting since the protractor when adjusted retains such adjustment as a complete working, self-contained unit. Of course, should it be necessary to change the angular adjustment for operational reasons at any time, as for example when the protractor serves as a work piece support in machining, this can be accomplished quite expeditiously, merely by separating the sine bar 10 from the gage block assembly 18 and adjusting the gage block assembly to the calculated height and returning or allowing the sine bar to return to the gaged relationship to the gage block or block assembly.

It will thus be observed that I have not only provided a sine protractor of unusual simplicity and efficiency but one which is extremely versatile with respect to the type of work to which it can be applied, and which is quite adaptable, largely because of its capability of quick adjustment and ready adaptability for uses requiring it to be moved from place to place while in a predetermined state of angular adjustments.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a sine protractor structure, a gage block retainer comprising a plate having a longitudinal retainer slot dimensioned to afford sufficient clearance to receive a gage block therein for seating against a plane surface of a protractor member, and retaining pins on said plate extending from a face thereof adjacent to the opposite ends of said slot.

2. In combination in a sine protractor, a portable base member, a sine bar member having one end portion pivotally connected to one end portion of said base member, said members being adapted to be pivoted apart to desired angularity and being receptive of gage block structure therebetween to determine said angularity, and resilient means for holding the members clamped against the gage block structure, said members having respective projections at the opposing distal ends thereof and said resilient means being connected to said projections.

3. In combination in a sine protractor assembly, a base having a true plane gage block receiving surface, a sine bar member cooperatively related to the base bar member for angular disposition relative to said plane surface, a flat retainer frame lying on said plane surface and having a slot therein of a width and length to receive a gage block either lengthwise or on end closely between the longitudinal edges defining the slot and with the gage block resting accurately in face to face relation on said plane surface, and means for retaining said retainer frame against displacement in any direction parallel to said plane surface.

4. In combination in a sine protractor, a base bar, a sine bar, means pivotally connecting said bars adjacent to one end, said sine bar having on the inner side of the opposite end portion thereof gaging means opposing the inner surface of the base bar, a gage block retainer comprising a frame having an opening for receiving a gage block therein with sufficient clearance to seat therethrough, and means on said retainer for removably connecting the retainer to said base bar on the inner face area thereof opposing said gaging means of the sine bar, whereby a gage block can rest against the inner face of the base bar through said opening in said retainer and will be held by the retainer against sliding off of the base bar when the protractor is transported from place to place with a gage block set-up therein.

RAYMOND ARTHUR MULL.

(References on following page)

REFERENCES CITED

The following references are of record in the file of this patent:

UNITED STATES PATENTS

| Number | Name | Date |
|---|---|---|
| 500,046 | Ahne | June 20, 1893 |
| 910,330 | Wait | Jan. 19, 1903 |
| 1,395,664 | Benson | Nov. 1, 1921 |
| 1,409,343 | Karasick | Mar. 14, 1922 |
| 1,532,910 | McCann | Apr. 7, 1925 |
| 1,766,546 | Roos | June 24, 1930 |
| 1,816,464 | Biggert | July 28, 1931 |
| 2,075,008 | Damm | Mar. 30, 1937 |
| 2,111,299 | Robbins | Mar. 15, 1938 |
| 2,147,800 | Sadowski | Feb. 21, 1939 |
| 2,296,820 | Lester | Sept. 22, 1942 |
| 2,317,226 | Seyferth | Apr. 20, 1943 |
| 2,351,773 | Lovenston | June 20, 1944 |
| 2,378,743 | Wisne | June 19, 1945 |
| 2,397,300 | Tilton | Mar. 26, 1946 |
| 2,398,121 | Silvermaster | Apr. 9, 1946 |
| 2,409,817 | Webber | Oct. 22, 1946 |
| 2,429,517 | Knapp | Oct. 21, 1947 |

FOREIGN PATENTS

| Number | Country | Date |
|---|---|---|
| 365,244 | France | Sept. 5, 1906 |

OTHER REFERENCES

American Machinist, page 540, Aug. 16, 1933.
Johansson Cat. #17, Ford Motor Co., Dearborn, Mich., page 23. Rec'd Aug. 9, 1945.